(12) United States Patent
Torii et al.

(10) Patent No.: US 7,232,953 B2
(45) Date of Patent: Jun. 19, 2007

(54) INSULATION CAP AND JOINED ELECTRICAL WIRE USING THE SAME

(75) Inventors: Chieko Torii, Shizuoka (JP); Takayuki Yamamoto, Shizuoka (JP); Masato Ozawa, Shizuoka (JP); Masaru Fukuda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/055,031

(22) Filed: Feb. 11, 2005

(65) Prior Publication Data

US 2005/0191882 A1    Sep. 1, 2005

(30) Foreign Application Priority Data

Feb. 13, 2004  (JP)  ............................. 2004-036203
Dec. 24, 2004  (JP)  ............................. 2004-373112

(51) Int. Cl.
*H02G 15/02* (2006.01)

(52) U.S. Cl. ...................... 174/74 R; 174/76

(58) Field of Classification Search ............. 174/74 R, 174/74 A, 75 F, 75 D, 77 R, 79, 84 R, 84 C, 174/86, 88 R, 92, 93
See application file for complete search history.

(56) References Cited

U.S. PATENT DOCUMENTS

| | | | | |
|---|---|---|---|---|
| 2,925,461 A | * | 2/1960 | Anderson | 174/87 |
| 3,132,202 A | * | 5/1964 | Wolf | 174/87 |
| 3,558,800 A | * | 1/1971 | Wallis et al. | 174/87 |
| 3,597,528 A | * | 8/1971 | Penfield et al. | 174/87 |
| 3,678,174 A | * | 7/1972 | Ganzhorn | 174/84 R |
| 3,937,870 A | * | 2/1976 | Bumpstead et al. | 174/87 |
| 4,504,699 A | * | 3/1985 | Dones et al. | 174/84 R |
| 4,839,473 A | * | 6/1989 | Fox et al. | 174/138 F |
| 5,151,239 A | * | 9/1992 | King, Jr. | 264/272.11 |
| 5,252,779 A | * | 10/1993 | DiRienzo | 174/87 |
| 5,373,107 A | * | 12/1994 | Thomas et al. | 174/87 |
| 5,378,855 A | * | 1/1995 | Delalle | 174/87 |
| 6,025,559 A | * | 2/2000 | Simmons | 174/87 |
| 6,051,791 A | * | 4/2000 | King | 174/87 |
| 6,359,226 B1 | * | 3/2002 | Biddell et al. | 174/74 A |

FOREIGN PATENT DOCUMENTS

| | | |
|---|---|---|
| DE | 101 50 534 A1 | 9/2002 |
| DE | 102 02 102 A1 | 11/2002 |

(Continued)

*Primary Examiner*—William H. Mayo, III
(74) *Attorney, Agent, or Firm*—Armstrong, Kratz, Quintos, Hanson & Brooks, LLP

(57) ABSTRACT

An insulation cap of a wire joint of a joined electrical wire, the insulation cap including a cap main body for receiving the wire joint being formed by joining cores of a plurality of covered wires and an electro-conductive sleeve, and a flexible fastener provided on an inner wall of the cap main body for fastening the wire joint by contacting a rear end of the electro-conductive sleeve thereon. The flexible fastener is formed as an integral part of the cap main body by fastening a molding die through a hole provided at an opposite end of a joint insertion end of the cap main body. A plurality of flexible fasteners are provided axial symmetrically to extend toward a direction of inserting the wire joint from a base formed as an integral part of the inner wall of the cap main body.

11 Claims, 6 Drawing Sheets

FOREIGN PATENT DOCUMENTS

| | | |
|---|---|---|
| EP | 0 267 045 A2 | 11/1987 |
| JP | 01-286271 A | 11/1989 |
| JP | 8-22847 | 1/1996 |
| JP | 08-022847 A | 1/1996 |
| JP | 09-027354 A | 1/1997 |
| JP | 09-247835 A | 9/1997 |
| JP | 10-243539 | 9/1998 |
| JP | 10-243539 A | 9/1998 |
| JP | 2001-258142 A | 9/2001 |
| JP | 2002-231337 A | 8/2002 |

* cited by examiner

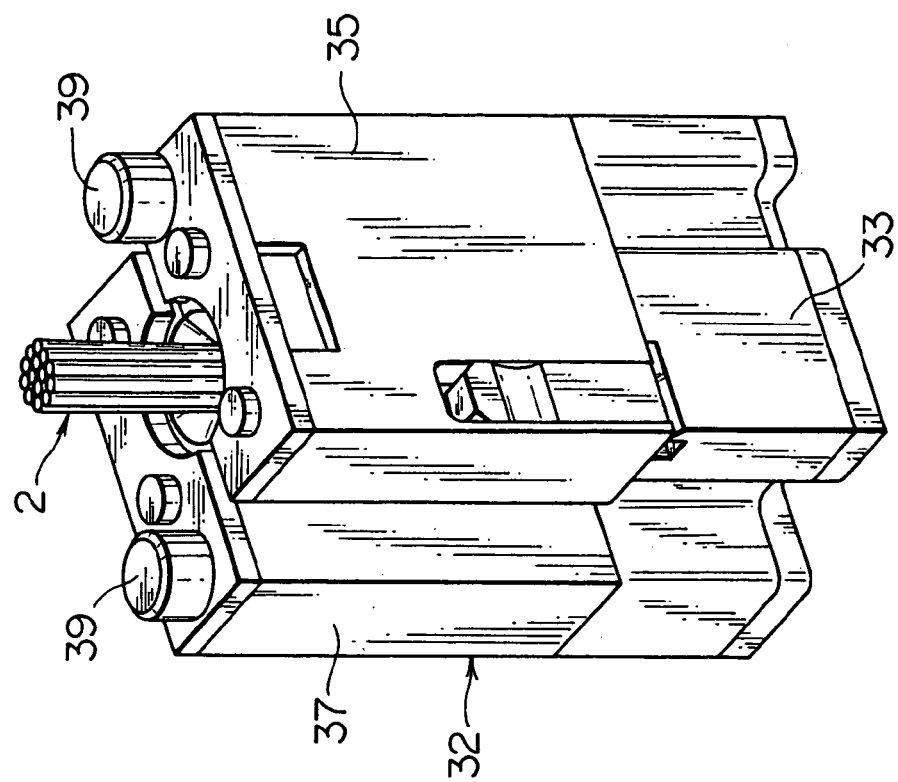
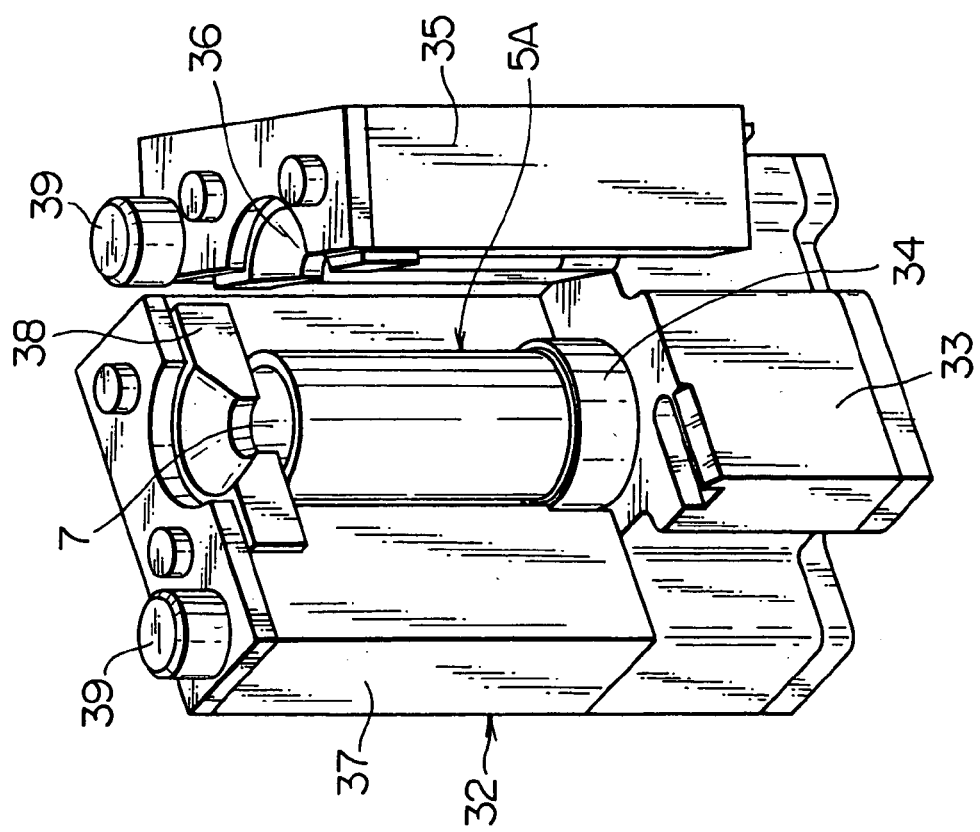

INSULATION CAP AND JOINED ELECTRICAL WIRE USING THE SAME

The priority application Number Japan Patent Application No. 2004-373112 upon which this patent application is based is hereby incorporated by reference.

BACKGROUND OF THE INVENTION

1. Field of the Invention

This invention relates to an insulation cap being put on a wire joint formed by joining cores of a plurality of covered wires and insulation cover near the wire joint, and a joined electrical wire using the insulation cap.

2. Description of the Related Art

An example of the insulation cap to be put on the wire joint of a plurality of covered wires and insulation cover near the wire joint is fixed with the covered wire by winding a tape around them. FIG. 15 shows an example of such insulation caps (refer patent document 1).

An insulation cap 50 shown in FIG. 15 includes a cap main body 51, which a wire joint 54 joining cores 53b together and insulation cover near the wire joint are inserted into, and a support plate 52 projecting from an opening edge of the cap main body 51 for fixing the covered wire. The cap main body 51 has an opening at one end and a closed end at the other end. The wire joint 54 is inserted through the opening as an insertion end, and sealant 56 is filled therethrough. Covered wires 53 are fixed on the support plate 52 with a tape 55 for preventing the wire joint 54 from falling out from the cap main body 51.

According to the insulation cap 50 by prior art, it is not assured that the inserted wire joint 54 is positioned at the center of cap main body 51. Therefore, the insulation cap 50 is fixed by curing the sealant 56 in a condition of the wire joint 54 positioned with a tilt. In that case, the sealant 56 is not filled in every corner so that the wire joint 54 is filled unevenly around it with the sealant 56 and the wire joint 54 does not have enough waterproofness.

FIG. 16 shows another example of insulation cap 60 by prior art, of which a wire joint 67 is positioned in the center (reference document 2). The insulation cap 60 has an opening at one end and a closed end at the other end as same as the insulation cap 50. A wire joint 67 is formed by joining cores 65b and an electro-conductive sleeve 66 together. The insulation cap 60 is formed into a stepped cylindrical shape. An insulation cover 65a near the wire joint 67 is covered by a large diameter part 61, and the wire joint 67 is received in a small diameter part 64 continued to the large diameter part 61. The large diameter part 61 is provided at an opening edge 62 with a flexible fastener 63 to be folded toward an inside of the insulation cap 60 around a base formed as an integral part of the opening edge 62.

The wire joint 67 is inserted while bending the flexible fastener 63. After the wire joint 67 is inserted completely, a top end of the flexible fastener 63 restored elastically to an initial position engages with a rear end of the sleeve 66 of the wire joint 67. Thereby, the wire joint 67 is prevented from falling out from the opening edge 62.

Patent references are follows;
Reference 1: Japan Patent Application No. H10-243539,
Reference 2: Japan Patent Application No. H8-22847.

Objects To Be Solved

However, a length of the flexible fastener 63 of the insulation cap 60 is short and the flexible fastener 63 is located near the opening edge 62 of the insulation cap 60. Thereby, the wire joint 67 is not received deeply in the insulation cap 60 so that a wire element of the core is exposed from the opening edge 62 and water comes into the insulation cap. Therefore, the wire joint 67 has poor waterproofness.

Even if the insulation cap 60 is made of a transparent or semitransparent resin, the wire joint 67 is located near the large diameter part 61 of the insulation cap 60. Therefore, a gap between the wire joint 67 and the insulation cap 60 is large to see difficultly inside the insulation cap 60. It cannot be confirmed from outside of the insulation cap 60 that the wire joint 67 is inserted into a predetermined position so that failures of fastening or waterproofing the wire joint 67 possibly occurs. When the wire joint 67 is inserted and a sealant for waterproofing is filled into the insulation cap 60, the sealant covers around the wire joint 67 and it becomes more difficult to see the wire joint 67.

SUMMARY OF THE INVENTION

To overcome the above problems, an object of the present invention is to provide an insulation cap, which enhances waterproofness of the wire joint of the joined electrical wire and improves quality and reliability of the joined electrical wire by reducing failures of fastening and waterproofing, and to provide a joined electrical wire using the insulation cap.

How To Attain the Object

In order to attain the object, an insulation cap according to an aspect of the present invention has a cap main body for receiving a wire joint, which is formed by joining cores of a plurality of covered wires and an electro-conductive sleeve for joining covered wires, and a flexible fastener provided inside the cap main body, abutting on a rear end of the electro-conductive sleeve for fastening the wire joint. The flexible fastener is formed as an integral part of the cap main body by taking out a molding die from an opening at an opposite end of a joint insertion end of the cap main body.

According to the insulation cap mentioned above, the flexible fastener is formed by taking out a molding die from an opening so that the flexible fastener can be formed integrally at a position apart from an opening edge (insertion edge) of the insulation cap, such as a middle or deep side of the insulation cap. The inserted wire joint is fastened by the flexible fastener and prevented from falling out from the insulation cap. Comparing with the insulation cap by prior art, of which the flexible fastener is folded inwardly, stiffness of the flexible fastener of the insulation cap according to the present invention can be increased. Therefore, the flexible fastener can be prevented from deformation and breakage, and reliability of fastening is improved. Inside of the insulation cap is filled with a sealant filled together with the wire joint and the insulation cover near the wire joint.

The insulation cap according to further aspect of the present invention is further specified in the insulation cap mentioned above by that a plurality of the flexible fasteners, which are continued to each base formed as an integral part of an inner wall of the cap main body and extend toward a direction of inserting the wire joint, are disposed at a position of axial symmetry.

According to the insulation cap mentioned above, when the wire joint is inserted from the opening edge of the insulation cap, the flexible fasteners are elastically deformed outwardly in a radial direction. The wire joint is inserted into a predetermined position in the insulation cap, and when the wire joint go over top ends of the flexible fasteners, the flexible fasteners are restored elastically to original shapes. Thereby, the top ends of the flexible fasteners engage with a rear end of the electro-conductive sleeve for joining covered wires and the wire joint is fastened. The top ends of the plurality of the flexible fasteners disposed at the position of axial symmetry abut on cores between the wire joint and the insulation covers, so that the wire joint is positioned at the center of the insulation cap.

The insulation cap according to further aspect of the present invention is further specified in the insulation cap mentioned above by that the cap main body is provided with a top cover for covering the opening.

According to the insulation cap mentioned above, the sealant filled in the cap main body can be prevented from leakage from the opening by covering the opening with the top cover. The sealant of low viscosity can be prevented more effectively from leakage.

The insulation cap according to further aspect of the present invention is further specified in the insulation cap mentioned above by that a blind end receiving section, which has dimensions and a shape capable of receiving the wire joint to be smaller in diameter than that of the cap main body, is formed to project from the cap main body.

According to the insulation cap mentioned above, when the insulation cap is attached on the wire joint and the insulation cover near the wire joint, the insulation cover near the wire joint is covered with the cap main body and the wire joint is received to be close to an inner wall of the receiving section. The blind end receiving section has a blind end so that the wire joint received therein is waterproofed from outside.

The insulation cap according to further aspect of the present invention is further specified in the insulation cap mentioned above by that the blind end receiving section is transparent or semitransparent.

According to the insulation cap mentioned above, it can be recognized visually whether or not the wire joint is inserted into a predetermined position of the insulation cap.

The insulation cap according to further aspect of the present invention is further specified in the insulation cap mentioned above by that the blind end receiving section is provided at an opening end thereof with a positioning stopper for limiting relative movement of the wire joint in a direction of inserting the wire joint.

According to the insulation cap mentioned above, the wire joint is limited about relative movement in both of insertion and opposite directions by the positioning stopper and the flexible fastener.

A joined electrical wire according to the present invention includes a plurality of covered wires, and the insulation cap according to further aspect of the present invention for receiving the wire joint by joining cores of the plurality of covered wires. An inside of the insulation cap is filled with the sealant.

According to the joined electrical wire mentioned above, the flexible fasteners can be formed as an integral part of the cap main body inside of the insulation cap at any position apart from the opening edge of the insulation cap, for example, a middle of the insulation cap and a deep side thereof.

The joined electrical wire according to further aspect of the present invention is further specified in the joined electric wire mentioned above by that the wire joint is formed by swaging an outer wall of the electro-conductive sleeve, into which the cores is inserted, to shrink a diameter of the electro-conductive sleeve for joining the cores and the electro-conductive sleeve with each other.

According to the joined electrical wire mentioned above, the outer wall of the electro-conductive sleeve is struck periodically by dies moving in a radial direction in cooperation with a backer so as to form the outer wall of the electro-conductive sleeve to have no gaps around it by a constant force. Thereby, the cores are fitted to an inner surface of the electro-conductive sleeve.

The above and other objects and features of this invention will become more apparent from the following description taken in conjunction with the accompanying drawings.

BRIEF DESCRIPTION OF THE DRAWINGS

FIG. 7 is a perspective view of a cap holder for manufacturing a joined electrical wire in a condition of setting the insulation cap in the cap holder, where one door is opened;

FIG. 8 is a perspective view of the cap holder, where doors are closed;

DESCRIPTION OF THE PREFERRED EMBODIMENT

Figure 1:
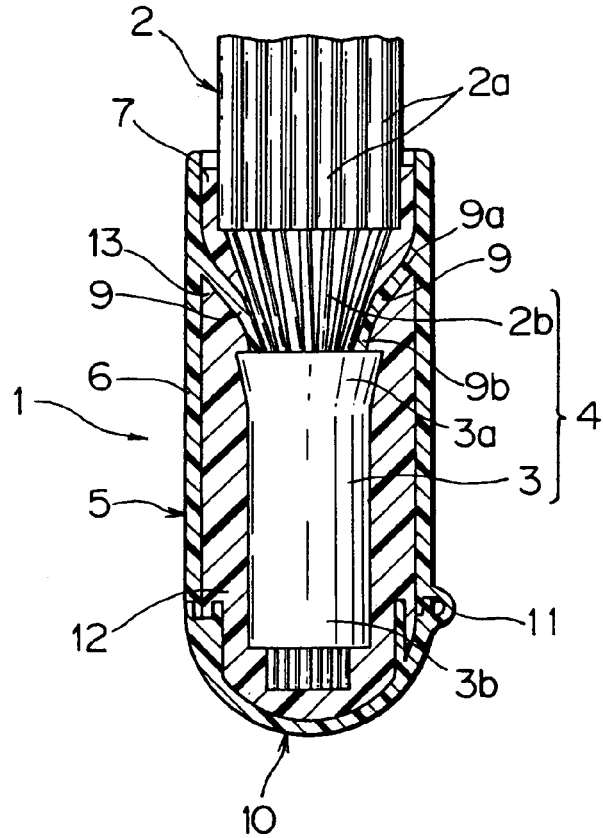
FIG. 1 is a cross-sectional view of a first embodiment of an insulation cap according to the present invention and a joined electrical wire using the insulation cap.

Embodiments of an insulation cap according to the present invention will be described with reference to drawings. FIG. 1 shows a first embodiment of the insulation cap and a joined electrical wire using the insulation cap according to this invention.

The joined electrical wire 1 includes a plurality of covered wires 2, an electro-conductive sleeve 3 for joining cores 2b at terminal side of the covered wires 2, a wire joint 4, a insulation cap 5 being mounted at the wire joint 4 and insulation covers 2a near the wire joint 4, and a sealant 12 for filling inside of the insulation cap 5.

The insulation cover 2a at the terminal side of the covered wire 2 is striped to expose a predetermined length of the core 2b. The exposed cores 2b are arranged in the same direction and twisted for preventing wire elements from being loosed, and crimp-contacted with the electro-conductive sleeve 3 for joining covered wires to be connected electrically with each other. The wire joint 4 is formed with the cores 2b and the electro-conductive sleeve 3. The wire joint 4 can be formed at a middle of the covered wires 2.

The electro-conductive sleeve 3 is made of an electrically conductive metallic material, such as soft copper and a like and formed into a pipe piece having openings at both ends thereof by cutting a long pipe material in a required length. The electro-conductive sleeve 3 is provided at a rear end thereof with a flare 3a having gradually increasing radius toward an opposite direction against a direction of inserting the covered wires like bell-mouth. The flare 3a is a guiding portion for inserting the cores 2b smoothly. A cylindrical body portion 3b is formed to have a size for receiving the cores 2b without strain. The body portion 3b is to be swaged and the flare 3a is not to be swaged.

The cores 2b is inserted from the flare 3a and is guided by the flare 3a into a boundary between the flare 3a and the body portion 3b, and is inserted into the body portion 3b. After the cores 2b are crimp-contacted with the electro-conductive sleeve 3, the body portion 3b excluding the flare 3a is swaged to form the wire joint 4.

Figure 4:
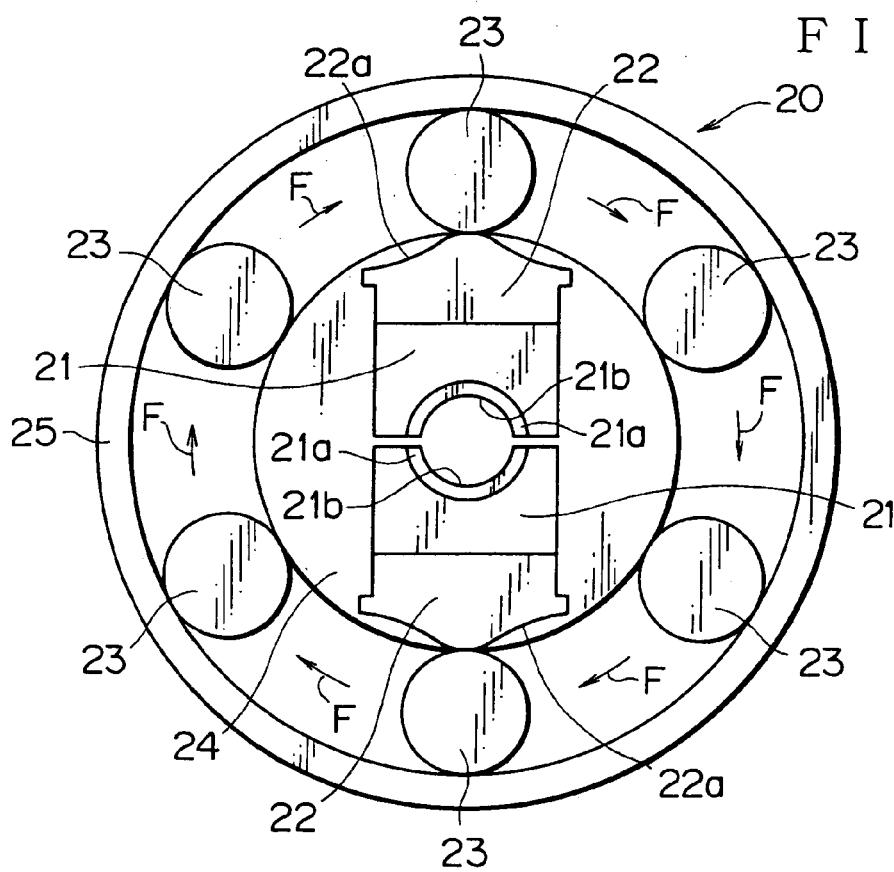
FIG. 4 is a front view of a swaging machine for swaging an electro-conductive sleeve.
Figure 11:
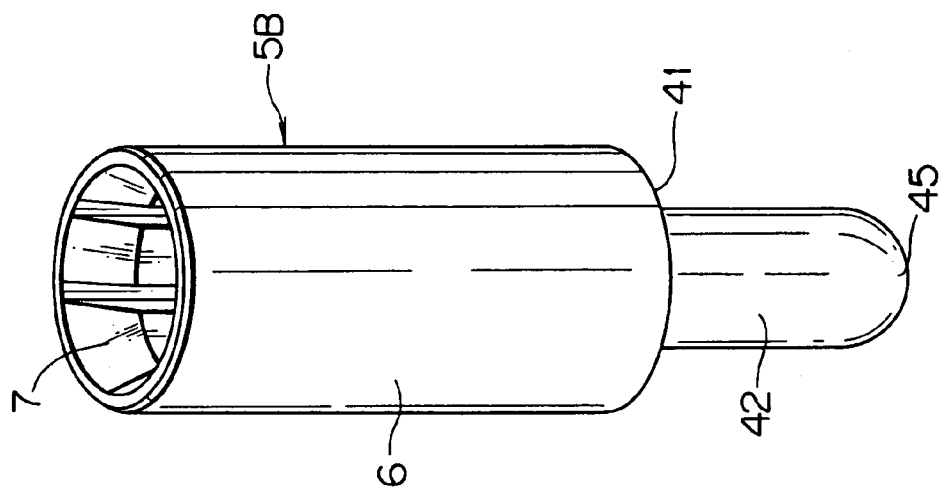
FIG. 11 is a perspective view of the insulation cap shown in FIG. 9.
Figure 10:
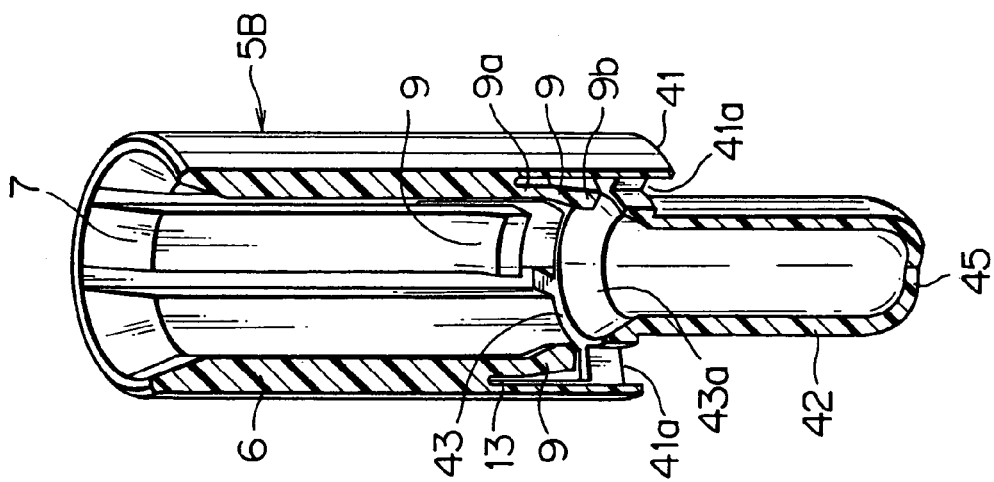
FIG. 10 is a vertical sectional view of the insulation cap shown in FIG. 9.

Swaging is a kind of plastic deforming process by a swaging machine 20 (FIG. 4). The process is by inserting the electro-conductive sleeve 3 as an object to be processed into a center of a rotating spindle 24 and striking uniformly the outer surface of the electro-conductive sleeve 3 with cooperation of a die 21 and a backer 22 to decrease the radius thereof. The process will be described in detail later.

Figure 2:
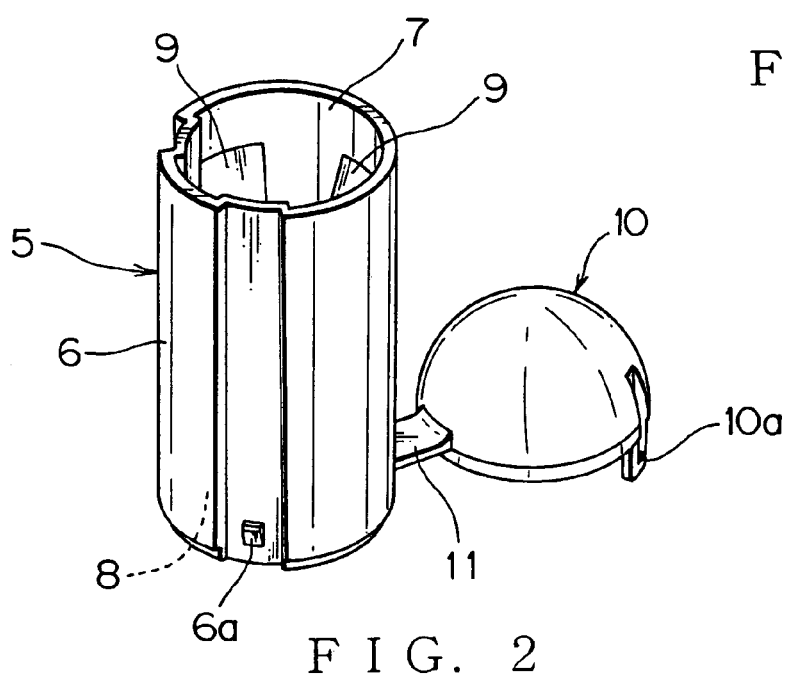
FIG. 2 is a perspective view of the insulation cap shown in FIG. 1.
Figure 3:
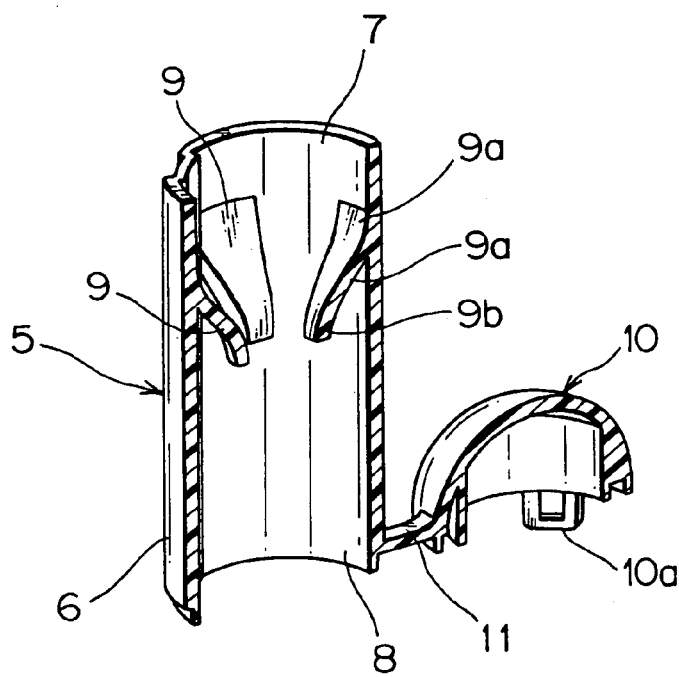
FIG. 3 is a vertical sectional view of the insulation cap shown in FIG. 2.

As shown in FIG. 2, the insulation cap 5 is formed with a transparent or semitransparent insulating synthetic resin, such as a polyvinyl chloride, polyethylene, polypropylene and the like. The insulation cap 5 includes a cylindrical cap main body 6 for receiving the wire joint 4, a flexible fastener 9 formed on an inner wall of the cap main body 6 integrally with the cap main body 6 for limiting a relative movement of the wire joint 4, and a top cover 10 formed at a top end of the cap main body 6 integrally with the cap main body 6 through a flexible base 11.

A method of forming the insulation cap 5 has steps of forming a molding cavity between an upper and lower molding dies (not shown), injecting melted resin into the cavity at an injection process, refilling the cavity with the resin at a holding pressure process, curing the melted resin at a cooling process, and separating the molding dies upwardly and downwardly at a releasing process.

The cap main body 6 has openings at the both sides thereof, and is formed into a size of receiving the wire joint 4 and insulation covers 2a near the wire joint 4. Thereby, not only the wire joint 4 but also the insulation covers 2a hear the wire joint 4 are waterproofed, and it is prevented that water led by the covered electric wires 2 penetrates into the insulation cap 5.

A top opening 7 at a top side of the cap main body 6 is an opening for inserting the wire joint 4 and the insulation covers 2a neat the wire joint 4 and for filling the sealant 12. A bottom opening 8 at a bottom side of the cap main body 6 is an opening for taking out the molding die for forming the flexible fastener 9.

In the conventional blind end insulation caps 50, 60, a molding die must be taken out from topside. Therefore, it is difficult or impossible to form the flexible fastener 9 on the inner wall of the insulation cap 5 integrally with the insulation cap 5. By taking out the molding die from the bottom opening 8 downwardly, the flexible fastener 9 can be formed on any position of the inner wall of the cap main body 6.

The flexible fastener 9 is for fastening the wire joint 4 as shown in FIG. 1 to limit the relative movement of the inserted wire joint 4 and prevent failing of the wire joint 4 from the insulation cap 5 until the sealant is cured. A plurality of flexible fasteners 9 are formed on the inner wall of the cap main body 6. The plurality of the flexible fasteners 9 are disposed axial symmetrically to each other, so that the flexible fasteners 9 are located at even intervals along a circumference of the inner wall.

The flexible fastener 9 is formed by fastening the molding die from the bottom opening 8, so that the flexible fastener 9 can be located at the middle or the deep side of the cap main body 6 without increasing a diameter of the cap main body 6. Thereby, the wire joint 4 can be received in the deep side of the insulation cap 5 and a size of the insulation cap 5 can be miniaturized. Unnecessary rooms in the insulation cap 5 are decreased so that waterproofness of the wire joint 4 can be improved.

Each flexible fastener 9 includes a base 9a formed as an integral part of an inner wall of the cap main body 6, and a free end 9b continued to the base 9a and extending therefrom slantingly against a direction of inserting the wire joint 4 from the opening. The base 9a is located at a slightly inside position in a direction of inserting the wire joint 4 from the opening 7. The free end 9b is bent around the base 9a to narrow a bending space 13 when the wire joint 4 is inserted, and restored elastically when the wire joint 4 is inserted completely into the deep portion. Thereby, the top end of the flexible fastener 9 abuts on the rear end (the flare 3a) of the electro-conductive sleeve 3, and the wire joint 4 is fastened in the insulation cap 5. The base 9a is formed to have large stiffness not to reduce flexibility of the free end 9b. Thereby, the flexible fastener 9 has a strong elastic restoring force to fasten the wire joint 4 securely, and the wire joint 4 is prevented from falling out from an insertion edge (an opening edge of the top opening 7) of the insulation cap 5.

The flexible fasteners 9 adjacent to each other have a gap therebetween so that the sealant 12 is not prevented from flowing. The sealant 12 penetrates into gaps between insulation covers 2a and gaps between wire elements of the cores by capillary action. Thereby, the insulation cap 5 is sealed tightly.

The top cover 10 is for preventing the sealant 12 filled in the cap main body 6 from leaking from the bottom opening 8. The top cover 10 is formed at the top end of the cap main body 6 integrally with the cap main body 6 through the flexible base 11. By rotating the top cover 10 around the base 11, and by engaging a lock eye 10a formed projecting from the end surface of the top cover 10 with a lock hook 6a of the cap main body 6, the top cover 10 is fixed on the cap main body 6.

The top cover 10 has a hemispherical shape. Thereby, tips of cores 2b exposed from a top end of the wire joint 4 and the top end of the electro-conductive sleeve 3 are received without interference with the top cover 10, and filled with the sealant 12. A gap between the top cover 10 and the cap main body 6 is filled with the cured sealant 12.

Two component urethane foam mixed with a curing agent is preferably used as the sealant 12. It viscosity can be changed, but the viscosity of 0.1–5 Pa*s at a room temperature is selected and the viscosity of 1 Pa*s is preferably used. The urethane foam is a resin which can foam by itself, and suitable for sealing a narrow gap. Epoxy resin, hot melt resin silicon resin and the like having insulation properties and waterproofness can be used for sealant 12.

A method of manufacturing the joined electrical wire is described herein. The joined electrical wire is manufactured when a wiring harness is wired at wiring process, or after or before the wiring process. The wire joint 4 of the plurality of covered wires 2 is formed by fitting the cores 2b into the electro-conductive sleeve 3, and arranging tops of the cores 2b, and swaging the electro-conductive sleeve 3 on the outer wall thereof uniformly.

Swaging process is described herein with reference to FIG. 4. The swaging is acted with the swaging machine 20. As shown in FIG. 4, the die 21 and the backer 22 abutting on each other are held movably in a spindle 24. A pair of holders (not shown) to be opened and closed freely for holding temporarily the electro-conductive sleeve 3 is provided at a front side of the spindle 24. The pair of holders can be opened and closed automatically by an actuator such as a motor (not shown) and a cylinder (not shown) according to a signal of a base switch (not sown). The pair of holder holds the electro-conductive sleeve 3 so as to insert the top end between the pair of the dies 21, 21 and expose the flare 14 of the rear end to out side.

Each die 21 is provided at an inner surface with an approach surface 21a and a process surface 21b continued to the approach surface 21a. The electro-conductive sleeve 3 is inserted smoothly from the topside to be adjusted on displacement of an axis thereof by the approach surface 21a.

The backer 22, a separate part from the die 21, is provided at outside of the die 21 in a radial direction. The backer 22 can rotate in a direction of an arrow F, and move in a radial direction (toward the center) in cooperation with the dice 21. A plurality of rollers 23 is located in outside of the backer 22 so as to move the die 21 in the radial direction in cooperation with the backer 22.

The swaging machine 20 acts as a following. By rotating the spindle 24, the die 21 and the backer 22 rotate, and the roller 23 rotates on its own axis. The backer 22 rotate, and the roller 23 rotates on its own axis. The backer 22 is provided at outside of the die 21 in the radial direction, so that the rotating backer 22 and the roller 23 abut on each other, and a cam surface 22a of the backer 22 advances the dice 12 inwardly in the radial direction to hit the outer surface of the electro-conductive sleeve 3.

When the backer 22 does not abut on the roller 23, the backer 22 slightly moves outwardly in the radial direction by a centrifugal force, and the die 21 is apart from the electro-conductive sleeve 3. Thereby, hitting the electro-conductive sleeve 3 by the die 21 stops temporarily. The backer 22 and the roller 23 abut again on each other, so that an action mentioned above is repeated.

A raw material of the electro-conductive sleeve 3 is compressed uniformly in the radial direction, so that gaps between the electro-conductive sleeve 3 and the cores 2b, and gaps between cores 2b are removed. Thereby, contact resistance becomes smaller and stable electrical performance can be obtained. Also, dimensions of the wire joint 4 can be controlled stably and quality of the wire joint 4 can be made stable.

The swaged wire joint 4 is inserted together with the sealant 12 into the insulation cap 5, which the top cover 10 is closed, from the opening end thereof. Or, the swaged wire joint 4 is inserted into the insulation, which the top cover 10 is closed and is half filled with the sealant 12, from the opening end thereof. After the sealant 12 is cured while the insulation cap 5 is held by a jig (not shown) not to be tumbled down, the joined electrical wire 1 is released from the jig. Thus, the joined electrical wire 1 is manufactured.

According to the first embodiment, the flexible fastener 9 is formed as an integral part of the inner wall of the insulation cap 5 by fastening the molding die from the bottom opening 8 of the insulation cap 5. Thereby, the wire joint 4 can be received in the deep side of the insulation cap 5, so that exposure of the loosed wire elements from the top opening 7 and water penetration from outside can be prevented effectively. The bottom opening 8 of the insulation cap 5 is closed by the top cover 10 so that the sealant 12 can be prevented from leaking.

Figure 5:
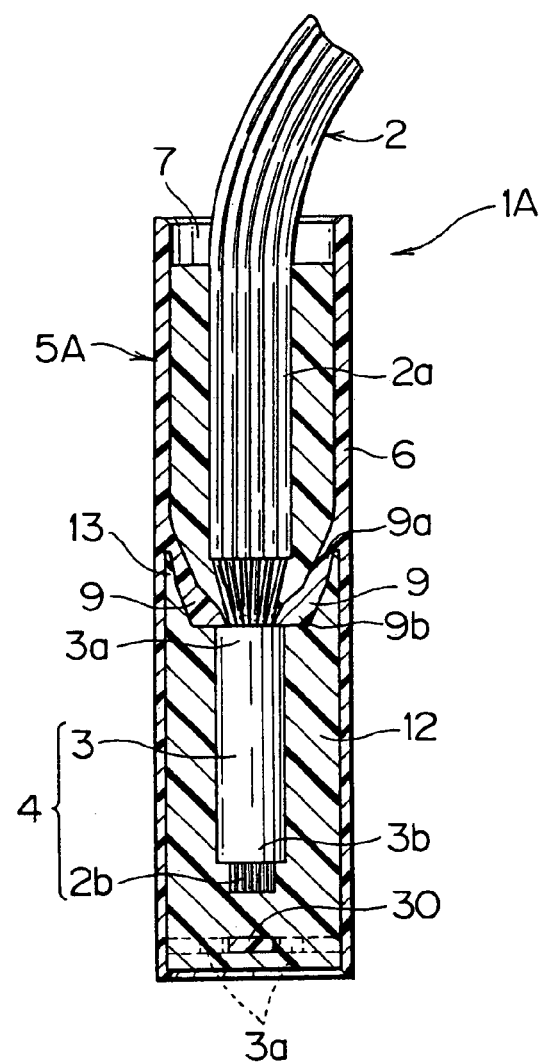
FIG. 5 is a cross-sectional view of a second embodiment of an insulation cap according to the present invention and a joined electrical wire using the insulation cap.
Figure 6:
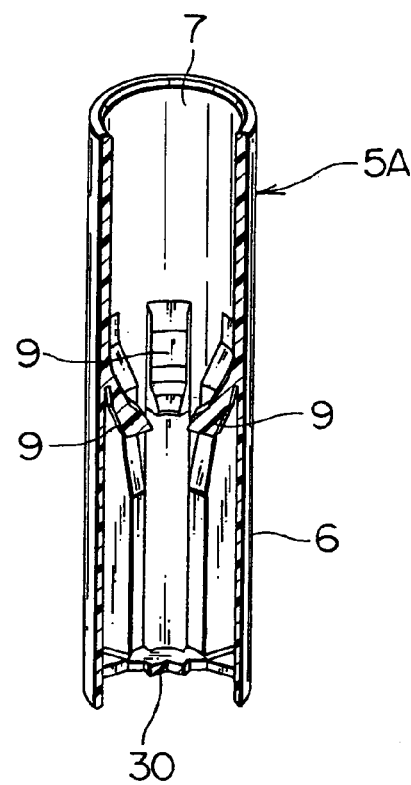
FIG. 6 is a vertical sectional view of the insulation cap shown in FIG. 5.

A second embodiment of an insulation cap according to the present invention and a joined electrical wire using the insulation cap are described with reference to FIGS. 5, 6. An insulation cap 5A differs from the first embodiment in a point that the insulation cap 5A includes a bottom portion 30 having a fastening hole 30a for a molding die instead of the top cover 10. Other structuring components are common to the first embodiment, so that the same markings are applied and detailed description is omitted herein.

The bottom portion 30 is formed flat to be recessed from an end of the cap main body 6. The fastening hole 30a formed in the bottom portion 30 is located corresponding to the flexible fastener 9 and formed with even intervals along a circumference of the inner wall of the cap main body 6. A size and a shape of each fastening hole 30a is formed according to a size and a shape of the molding die for forming the flexible fastener 9. The fastening hole 30a is closed by a later-described method to prevent leakage of the sealant 12.

Three-flexible fasteners 9 are formed in an approximate middle in an axial direction of the cap main body 6 with three equal intervals symmetrically in axis. Number of the flexible fasteners 9 is not limited at three, and selectable to fasten the wire joint 4 at the center of the axis of the cap main body 6 with good proportion (FIG. 6).

When the wire joint 4 is inserted into the insulation cap 5A (FIG. 5), the insulation covers 2a continued to the wire joint 4 are held in the insulation cap 5A with the same length of the wire joint 4 or longer than that. Thereby, when the covered wires 2 at outside of the insulation cap 5A are bent for separating two parts, the covered wires 2 in the insulation cap 5A are not effected easily by bending. The wire joint 4 is inserted deeply from the end, so that loosed wire elements of the wire joint 4 does not go out from the top opening 7 of the insulation cap 5A.

For manufacturing the joined electrical wire 1A using the insulation cap 5A, a cap holder 32 as shown in FIGS. 7, 8. The cap holder 32 is a jig for holding the insulation cap 5A elastically to prevent leakage of the sealant 12 from the top opening 7 and the fastening hole 30a until the liquid sealant 12 filled in the insulation cap 5A is cured. The cap holder 32 includes a pushing pin 34 for pushing the bottom portion 30 of the insulation cap 5A, and a pair of half-divided sealing pieces 36, 38 to clamp the insulation cap 5A between the pushing pin 34, and to seal the top opening 7.

The pushing pin 34 is provided at a jig body 33 to have a spring force so as to move up and down. Each half-divided sealing pieces 36, 38 is provided at each of a pair of doors 35, 37 capable to be open and close freely around a shaft 39. Mating surfaces of the pair of half-divided sealing pieces 36, 38 have a wire hole for inserting the wire joint 4 therethrough and clamping the insulation covers 2a by inner walls of the wire hole with no gap.

In a condition of opening at least one door 35, the insulation cap 5A is set in the cap holder 32 with pushing the pushing pin 34 down (FIG. 7). By closing the one door 35, the pair of half-divided sealing pieces 36, 38 is joined together, and the insulation cap 5A is pushed up, so that the pair of half-divided sealing pieces 36, 38 contacts with the top opening 7 of the insulation cap 5A (FIG. 8). The pushing pin 34 is provided at a top surface thereof with a ring groove (not shown) By fitting a ring-shape end of the insulation cap 5A in the ring groove, a sealed space is formed at a rear surface of the bottom portion 30. Thereby, leakage of the sealant from the fastening hole 30a to outside of the insulation cap 5A is prevented. Each door 35, 37 and the jig body 33 are fastened by engaging flexible fasteners 35a, 37a of the doors 35, 37 and a cutout 33a of the jig body 33.

After the liquid sealant 12 is poured to fill a predetermined position through the wire hole as shown in FIG. 8, the wire joint 4 of the covered wires 2 and the insulation covers 2a near the wire joint 4 are inserted through the wire hole. After curing the sealant 12, opening the door 35 and removing the cap holder 32, the joined electrical wire 1A is formed as shown in FIG. 5.

According to the second embodiment mentioned above, the insulation cap 5A includes the bottom portion 30 formed with fastening holes 30a for the molding die. Therefore, the insulation cap 5A has a simpler structure than the insulation cap 5 according to the first embodiment which the top cover 10 is formed integrally therewith, so that moldability is improved. Leakage of the sealant 12 from the insulation cap 5A is prevented by using the cap holder 32.

A third embodiment of an insulation cap and a joined electrical wire using the insulation cap are described with reference to FIGS. 9–14. An insulation cap 5B differs from previous embodiments in a point that the insulation cap 5B includes a small diameter receiving section 42 projecting from a bottom portion 41 of the large diameter cap main body 6. Other structuring components are common to the previous embodiments, so that the same markings are applied and detailed description is omitted herein.

Figure 9:
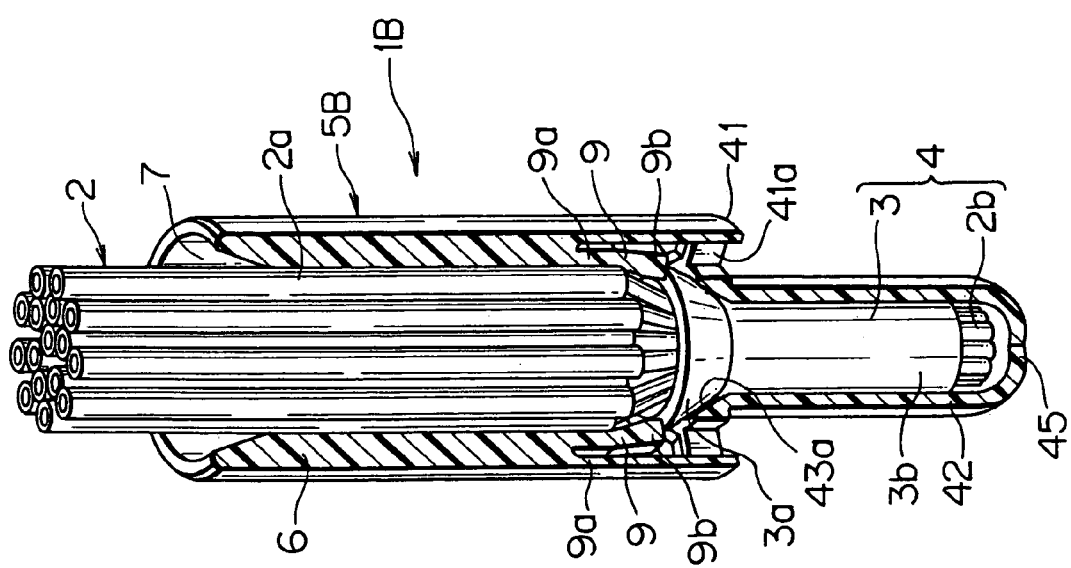
FIG. 9 is a cross-sectional view of a third embodiment of an insulation cap according to the present invention and a joined electrical wire using the insulation cap.
Figure 12:
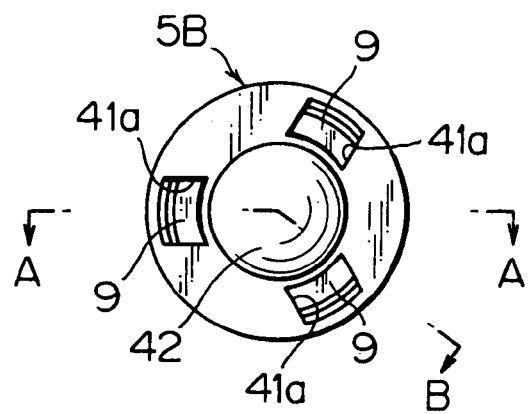
FIG. 12 is a bottom view of the insulation cap shown in FIG. 9.

The large diameter cap main body 6 has a cylindrical body to cover the insulation cover 2a near the wire joint 4. The cap main body 6 has a top opening at upper side and a bottom portion 41 at bottom side. The bottom portion 41 is formed with three fastening holes 41a for fastening a lower molding die for molding the flexible fastener 9 (FIGS. 9, 12).

The three flexible fasteners 9 are located with even intervals along a circumference of a inner wall of the cap main body 6. Thereby, the wire joint 4 is fastened with good balance by the three flexible fasteners 9, and preventing penetration of the sealant 12 caused by deviation of contact between the insulation covers 2a neat the wire joint 4 and an inner wall of the insulation cap 5B is eliminated.

Figure 13:
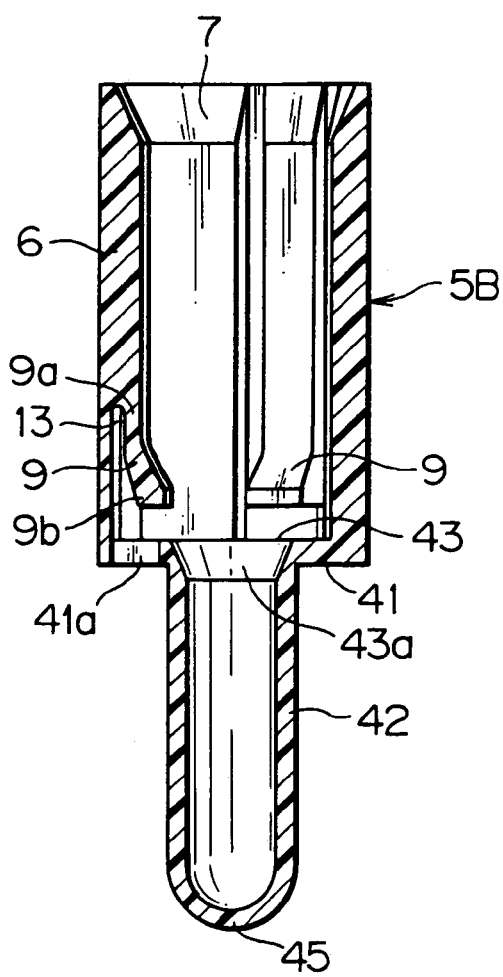
FIG. 13 is a vertical sectional view taken along the line A—A in FIG. 12.
Figure 14:
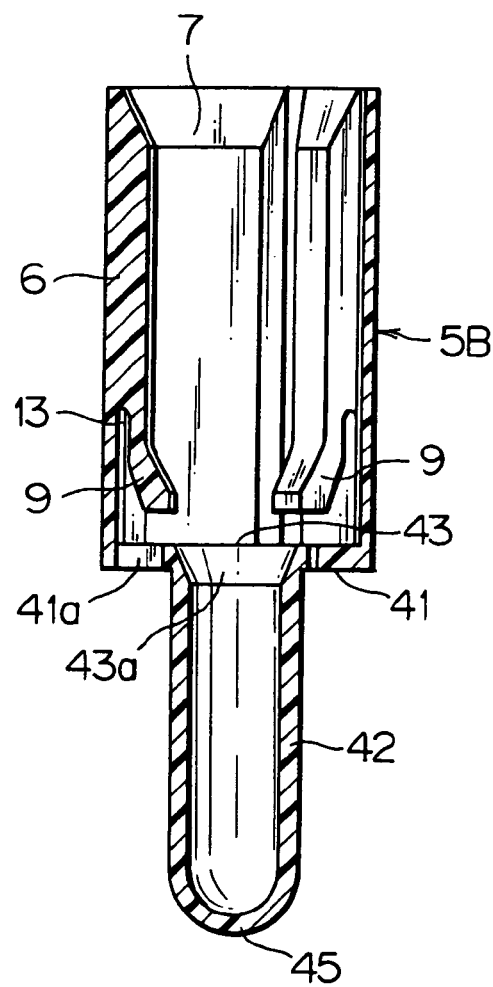
FIG. 14 is a vertical sectional view taken along the line A–B in FIG. 12.
Figure 15:
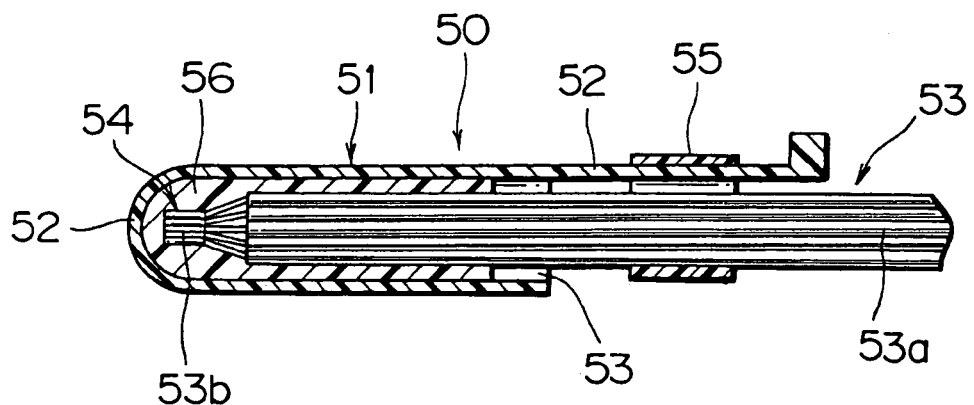
FIG. 15 is a cross-sectional view of one example of an insulation cap by prior art.
Figure 16:
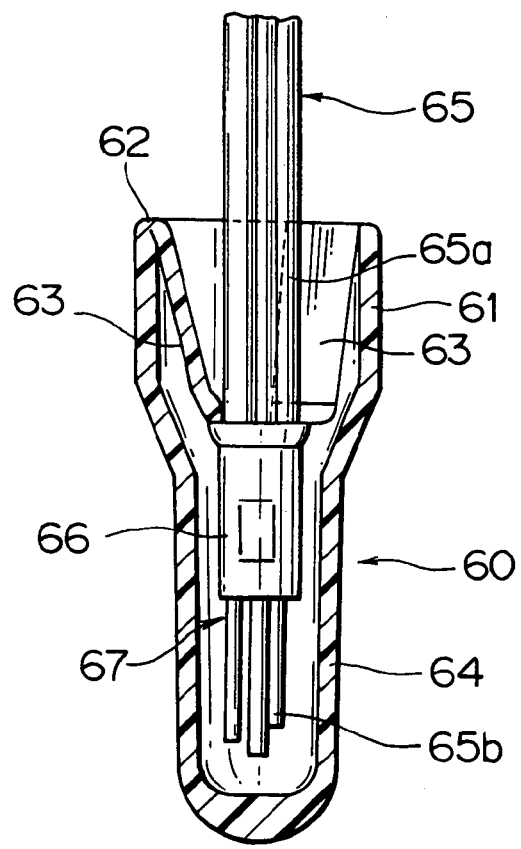
FIG. 16 is a cross-sectional view of the other example of an insulation cap by prior art.

A bending space 13 is provided between the flexible fastener 9 and the cap main body 6 (FIGS. 13, 14). When the wire joint 4 is inserted, the flexible fastener 9 is deformed elastically to narrow the bending space 13. After the wire joint 4 goes through the flexible fastener 9, the flexible fastener 9 is restored elastically to initial condition, and a top of the free end 9b abuts on the flare 3a of the electro-conductive sleeve 3. Thereby, the wire joint 4 is fastened not to go out from an insertion end.

The receiving section 42 has an opening communicating with an internal space of the cap main body 6 at one end thereof and a closed hemispherical bottom 45 at the other end thereof. The receiving section 42 is formed projecting from the center of the bottom portion 41, as an inner part of the three fastening holes 41a, coaxially with the cap main body 6. The receiving section 42 is formed on a size and a shape to fit the received wire joint 4. The receiving section 42 has a small diameter not to interfere with insertion of the wire joint 4 and to maintain a gap between the wire joint 4, which the sealant can penetrate. Therefore, the wire joint 4 is received to near to an inner wall of the receiving section 42. The receiving section 42 has a wall thickness as approximately same as that of the cap main body 6 or thinner than that not to affect strength of the receiving section 42. The receiving section 42 is preferably made to be transparent or semitransparent for visual checking.

When the wire joint 4 is received in the receiving section 42 (FIG. 9), the wire joint 4 is positioned at an approximate center of the insulation cap 5B. Thus, fasten gaps between the flare 3a of the electro-conductive sleeve 3 and three flexible fasteners 9 are obtained so that the wire joint 4 is fastened with good balance. Deviation of contact between the insulation covers 2a neat the wire joint 4 and the inner wall of the insulation cap 5B is eliminated, so that the sealant 12 can penetrate uniformly around the insulation covers 2a.

The sealant 12 is poured in the receiving section 42 before the wire joint 4 is inserted. Urethane foam is used for the sealant 12. The sealant 12 penetrates into a narrow gap between wire joint 4 and receiving section 42 by capillary action and the receiving section 42 is sealed with no gap by foaming. After filling the sealant between the wire joint 4 and the receiving section 42, the gap between the wire joint 4 and the receiving section 42 is very small so that it is confirmed visually that the wire joint 4 is inserted into a deep side of the receiving section 42. Thereby, failure of fastening or waterproofing of the wire joint 4 can be prevented.

The blind end receiving section 42 has a blind end so that leakage of the sealant 12 is prevented and deterioration of insulation and waterproofness of the wire joint 4 is prevented.

The receiving section 42 is provided at an opening end 43 thereof with a tapered surface 43a (positioning stopper) having gradually increasing radius toward outside. Thereby, the wire joint 4 is inserted smoothly from the opening end 43 to be guided by the tapered surface 43a. The flare 3a of the electro-conductive sleeve 3 abuts on the tapered surface 43a so that the wire joint 4 is positioned in a direction of insertion.

Movement of the wire joint 4 is limited in a direction of insertion and an opposite direction by the tapered surface 43a and the flexible fastener 9. Thereby, the wire joint 4 can be positioned at a certain position. The insulation cap 5B can be fixed securely on the wire joint 4 without looseness. Quality of waterproofing the wire joint 4 can be made stable. A gap in the insulation cap 5B caused by moving the insulation cap 5B after the sealant 12 is cured can be prevented.

For manufacturing the joined electrical wire 1B using the insulation cap 5B, the cap holder 32 shown in FIGS. 7, 8 can be used as same as the second embodiment. Differently, the pushing pin 34 of the cap holder 32 is provided with an opening (not shown) for inserting the receiving section 42 therethrough. The insulation cap 5B is set in the jig similarly as the method of manufacturing the joined electrical wire 1A of the second embodiment. Differently, the insulation cap 5B is set in the cap holder 32 in a condition of opening the pair of doors 35, 37 of the cap holder 32. Other processes are the same so that the description about it is omitted herein.

According to the third embodiment of the insulation cap, by making at least the receiving section 42 transparent or semitransparent, a condition of the wire joint 4 inserted in the receiving section 42 can be confirmed visually. Thereby, failures of fastening and waterproofing of the wire joint 4 can be prevented so that quality of manufacturing the joined electrical wire 1B can be improved. Even if the receiving section is opaque, the wire joint 4 is inserted smoothly by guiding to be centered for filling the sealant 12 uniformly around the wire joint 4.

The above mentioned embodiments are only typical examples according to the present invention, and the invention is not limited to the embodiments. Various modifications can be made without departing from the scope of the present invention. In the first embodiment of the insulation cap 5, the top cover 10 is formed as an integral part of the cap main body 6 through the flexible base 11, but the cap main body 6 and the top cover 10 can be formed separately.

In the first embodiment of the insulation cap 5, the sealant 12 is filled from the top opening 7 of the insulation cap 5. Instead of that, the sealant 12 can be filled from the bottom opening 8 (fastening hole 30a, 41a). Closing the top cover 10, inserting the wire joint 4 and the insulation covers 2a near the wire joint 4 from the top opening 7, turning the insulation cap 5 upside down, and filling the sealant 12 from the bottom opening 8, the insulation cap 5 is turned over. Thereby, the sealant 12 moves upward with filling around the wire joint 4, and bubbles in the insulation cap 5 move upward together, so that the bubbles are discharged from the top opening 7 of the insulation cap 5. Therefore, bubbles are not generated around the wire joint 4, and insulating and waterproofing performances are improved.

What is claimed is:

1. An insulation cap comprising:
a cap main body for receiving a wire joint, being formed by joining cores of a plurality of covered wires and an electro-conductive sleeve;
a plurality of the flexible fasteners are continued to each base formed as an integral part of an inner wall of the cap main body, and extend toward a direction of inserting the wire joint, and are disposed at a position of axial symmetry, being disposed inside of the cap main body for fastening the wire joint within the cap main body by abutting on a rear end of the electro-conductive sleeve,
whereby the flexible fastener is formed as an integral part of the cap main body by taking out a molding die through an opening at an opposite end of a joint insertion end of the cap main body, and
a blind end receiving section is formed at the opposite end projectingly on the cap main body, said blind end receiving section spaced from said flexible fasteners in a direction of said opposite end and having dimensions and a shape capable of receiving the wire joint to be smaller in diameter than that of the cap main body.

2. The insulation cap according to claim 1, wherein said cap main body is provided with a top cover for covering said opening.

3. A joined electrical wire comprising:
a plurality of covered wires; and
the insulation cap according to claim 2 for receiving the wire joint of cores of the plurality of covered wires,
wherein an inside of the insulation cap is filled with a sealant.

4. The insulation cap according to claim 1, wherein the blind end receiving section is transparent or semitransparent.

5. The insulation cap according to claim 4, wherein the blind end receiving section at the opposite end is provided with a positioning stopper for limiting relative movement of the wire joint in a direction of inserting the wire joint.

6. A joined electrical wire comprising:
a plurality of covered wires; and
the insulation cap according to claim 5 for receiving the wire joint of cores of the plurality of covered wires,
wherein an inside of the insulation cap is filled with a sealant.

7. A joined electrical wire comprising:
a plurality of covered wires; and
the insulation cap according to claim 4 for receiving the wire joint of cores of the plurality of covered wires,
wherein an inside of the insulation cap is filled with a sealant.

8. The insulation cap according to claim 1, wherein the blind end receiving section at the opposite end is provided with a positioning stopper for limiting relative movement of the wire joint in a direction of inserting the wire joint.

9. A joined electrical wire comprising: a plurality of covered wires; and the insulation cap according to claim 8 for receiving the wire joint of cores of the plurality of covered wires, wherein an inside of the insulation cap is filled with a sealant.

10. A joined electrical wire comprising:
a plurality of covered wires; and
the insulation cap according to claim 1 for receiving the wire joint of cores of the plurality of covered wires,
wherein an inside of the insulation cap is filled with a sealant.

11. The joined electrical wire according to claim 10, wherein the wire joint is formed by swaging an outer wall of the electro-conductive sleeve, into which the cores are inserted, to shrink a diameter of the electro-conductive sleeve for joining the cores and the electro-conductive sleeve with each other.

* * * * *